Nov. 22, 1960                R. F. LONABERGER ET AL                2,960,831
                                      INJECTOR
Filed March 12, 1954                                            2 Sheets-Sheet 1
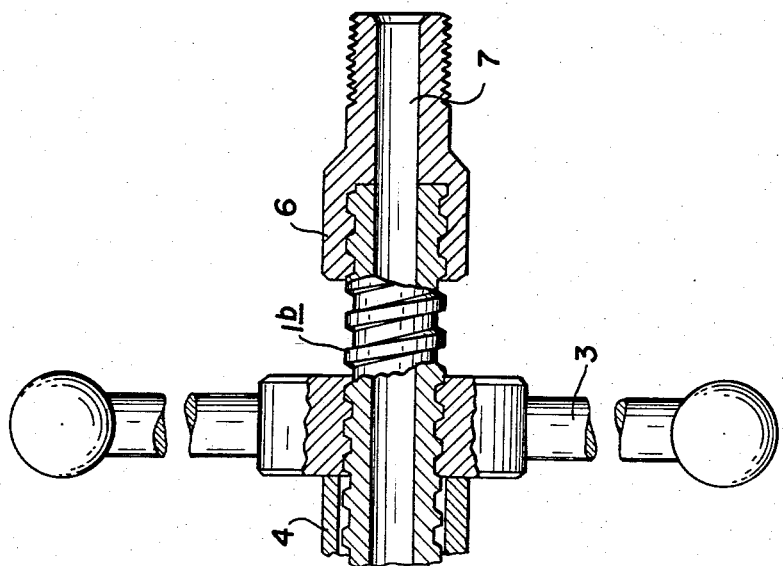
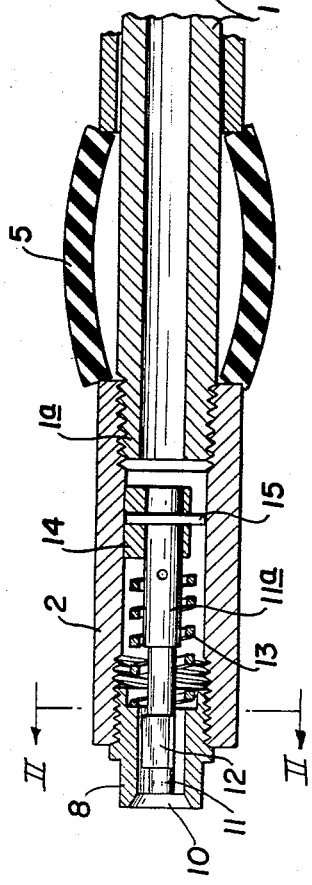
INVENTORS
Robert F. Lonaberger and
Donald Hahn
BY
William J. Ruano
their ATTORNEY Nov. 22, 1960   R. F. LONABERGER ET AL   2,960,831
INJECTOR
Filed March 12, 1954   2 Sheets-Sheet 2

INVENTORS
Robert F. Lonaberger and
Donald Hahn
BY
their ATTORNEY

United States Patent Office 2,960,831
Patented Nov. 22, 1960

2,960,831

INJECTOR

Robert F. Lonaberger and Donald Hahn, Mohnton, Pa., assignors to Stickler Associates, Inc., Mohnton, Pa.

Filed Mar. 12, 1954, Ser. No. 415,809

8 Claims. (Cl. 61—36)

This invention relates to injectors or injector valves, particularly those for injecting either a single or a dual flow of chemicals or other fluids into a medium to be impregnated by the chemicals, such as the ground or earth. The invention is particularly suitable for soil solidification, that is, to convert a porous mass, such as earth, into a non-porous mass by injecting into it two separate chemicals which are normally in liquid form, but which when combined form a solid, water-proof mass. This process, therefore, is particularly suitable in water-proofing basement walls from the outside and similar purposes.

An outstanding disadvantage of injectors used for injecting such chemical liquids into a leaky medium, such as the earth to make it waterproof has been the great tendency for the chemicals to combine within the injector itself, and thereby plug the orifices and passageways with solid material which is extremely difficult to remove and which interrupts water-proofing operations.

Another outstanding disadvantage of injectors used for injecting liquids or other fluids into a hole formed in the ground has been the tendency for the liquids to back up and escape along the outside of the injector to the surface of the ground instead of penetrating the depths thereof.

Still another disadvantage has been the necessity of providing different sized injectors for holes of different depths, adding greatly to the costs of operation.

An object of our invention is to provide a novel injector or valve which enables the injection of two different chemicals through separate paths through the injector so as to prevent the possibility of mixing of the chemicals and solidification while flowing through the injector.

Another object of our invention is to provide an injector wherein entirely separate exit ports are provided for the two liquids to keep them separate even when the liquids emerge through the nozzle or exit openings of the valves.

A still further object of our invention is to provide an injector valve device made up of readily attachable units to enable building up of the valve in selective lengths for different depths of holes or to meet different operating conditions.

A still further object of our invention is to provide an injector valve which is normaly biased to the closed position by springs and which is openable in response to the attainment of a predetermined pressure of the liquid or liquids conducted thereby, and which valve is provided with sealing means for preventing back up and escape of injected liquids when the injector valve is inserted into a hole in the ground slightly larger in size than its diameter.

A still further object of our invention is to provide a novel cap assembly for an injector valve, especially adapting it for use in injecting liquids or fluids into the soil.

Other objects and advantages of our invention will become more apparent from a study of the following description taken with the accompanying drawings wherein:

Figure 1 is a longitudinal cross-sectional view, shown partly broken away, of a single flow, chemical injector or valve embodying the principles of our invention.

Figure 2 is a transverse, cross-sectional view taken along line II—II of Figure 1.

Figure 3:
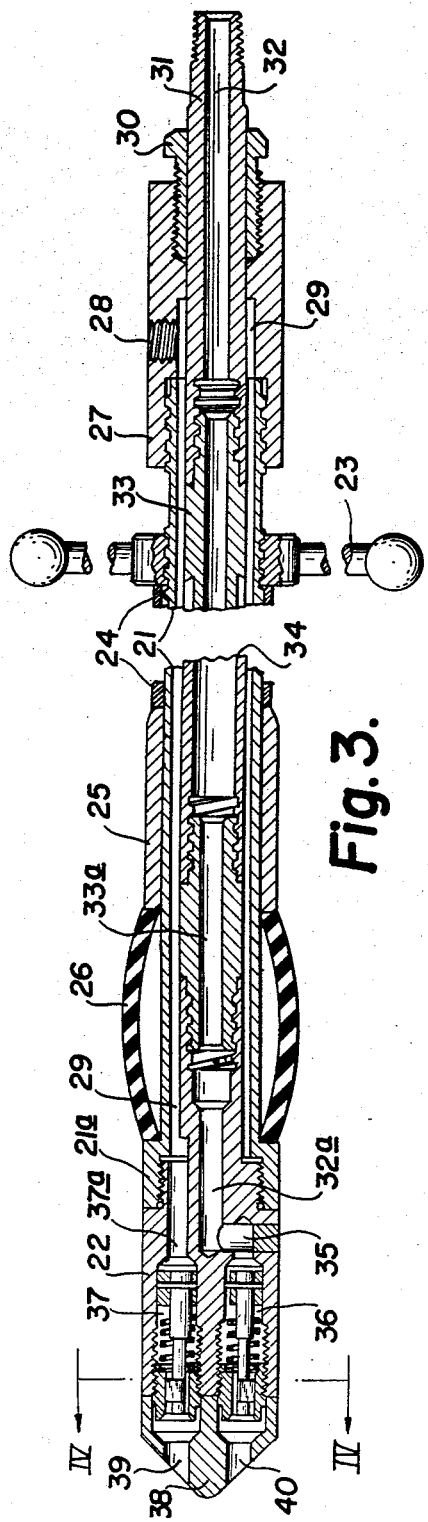
Figure 3 is a longitudinal cross-sectional view of a dual flow injector valve for conducting two chemicals, for example, along separate flow paths throughout the entire valve.

Referring more particularly to Figures 1 and 2 showing a single flow, chemical injector, numeral 1 denotes a long, hollow metallic cylindrical valve body having externally threaded end portions 1a and 1b. Onto end portion 1a is screw threadedly connected the internally threaded end portion of a metallic sleeve 2. Onto end portion 1b is screw threadedly mounted the hub portion of a handwheel 3. The handwheel is adapted to exert lateral pressure against a metallic compression sleeve 4 longitudinally slidable on body 1 and, which, in turn, exerts pressure against one end of a hollow cylindrical expansion sleeve 5 made of rubber or other suitable elastic or deformable material.

Thus when the injector is inserted into the ground through a drilled cylindrical hole which is slightly larger in diameter than sleeve 2 an effective seal is made to prevent escape of discharged liquid through the annular space surrounding the injector by virtue of expansion sleeve 5. That is, when the handwheel is turned in a direction to cause compression sleeve 4 to move towards sleeve 2, it will compress the expansion sleeve 5 so as to cause outward bowing in the manner shown in the drawing, sufficiently to provide sealing engagement with the surrounding wall of the drilled hole in the ground. Of course, upon retraction of the handwheel, expansion sleeve 5 will return to its normal cylindrical shape so as to allow the injector to be freely moved into or out into the drilled hole. As adaptor 6 is screw threadedly connected to one end of valve body 1 to receive a threaded end of a conduit which introduces the liquid chemical or fluid into the interior opening 7 of the valve body 1.

A valve seat cylindrical element 8 is screw threadedly connected to the extreme end of sleeve 2 and has a tapered valve seat surface ground on the end thereof onto which is adapted to be seated a valve 10 of corresponding shape, having a stem 11 to which is integrally secured a guide portion 12 of substantially triangular cross section, as shown more clearly in Figure 2, which is adapted to guide the stem axially of sleeve 2 at all times and at the same time permit the flow of liquid through the spaces between the triangular guide portion 12 and the inner wall of valve seat element 8. Valve 10 is normally biased to the closed portion by means of a helical spring 13 which has one end bearing against a well portion formed in the inner end of element 8, and having another end surrounding enlarged stem portion 11a and bearing against a valve guide element 14 which is connected to element 11a by means of a pin 15 and which further insures guided axial movement of the valve stem. However, valve guide element 14 may not be necessary and may be omitted in some instances since sufficient guiding may be provided by the guide portion 12 alone.

In operation, as the liquid chemical is introduced into the opening 7 at the right of the injector as viewed in Figure 1, it will travel along the inside of valve body 1 and flow externally of the valve guide element 14 and guide portion 12, and outwardly through the valve assuming that the valve 10 is urged to the open portion towards the left as viewed in Figure 1 as the result of build up of a predetermined pressure of the chemical liquid sufficiently to overcome the closing tendency of the spring 13. Upon a predetermined decrease in liquid pressure of the chemical, spring 13 will urge the valve stem to the right to the closed position so as to stop egress of liquid through the valve opening at the extreme left end of the injector. And as described previously, after the injector is inserted into a cylindrical hole drilled in the ground of slightly larger size so as to closely surround sleeves 2, 5 and 4, and after a sufficient portion of the injector is inserted into the hole, a liquid seal may be provided by tightening up on the handwheel, outside the hole, so as to cause bowing of expansion sleeve 5 sufficiently to provide sealing engagement with the interior surface of the hole in the ground, whereby liquid ejected under pressure through the valve opening will penetrate the ground rather than leak out through the annular opening surrounding the injector. Unscrewing of the handwheel will of course cause sleeve 5 to be restored to its normal cylindrical shape and thus allow free movement of the injector in or out of the hole.

Figure 4:
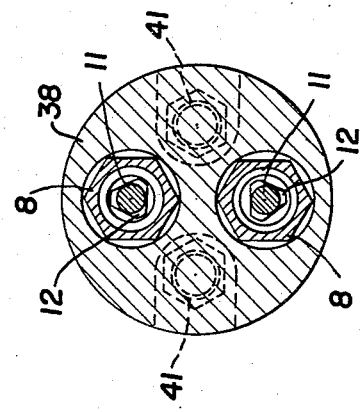
Figure 4 is an enlarged, transverse, cross-sectional view taken along line IV—IV of Figure 3.

Figures 3 and 4 show a modified form of injector involving dual, separate passageways for conducting two different chemicals or fluids therethrough and for maintaining separate flow throughout the injector, and even at the outlet or discharge openings of the valve. Another feature embodied in this modification (which could also be applied to that in Fig. 1) is that the injector is built up in sections, whereby the total length of the injector may be selectively varied and increased merely by screw threading additional sections onto those already forming the injector. Numeral 21 denotes a long cylindrical, sleeve-like valve body, shown broken away, and provided at the left end thereof an integral coupling portion 21a into which is screw threadedly connected an end portion of the valve head 22.

The other end of valve body 1 has screw threadedly mounted thereon a handwheel 23 adapted to bear against a long metallic compression sleeve 24 and a short metallic compression sleeve 25 slidably mounted on valve body 1 for transmitting compression forces to the expansion sleeve 26 of rubber or other suitable elastic material which is similar in operation to expansion sleeve 5 of Figure 1. A packing gland 27 is screw threadedly connected to a screw threaded end portion of valve body 21 and is provided with a tapped, fluid inlet 28 for introducing one of the chemical liquids into the injector, which liquid passes through a hollow annular outer passageway 29 extending throughout the entire length of the ejector. A packing nut 30 is screw threaded to the extreme end portion of packing gland 27 and surrounds a rear coupling 31 which is threaded at the end thereof and which has a central passageway 32 for introducing the second chemical liquid which is adapted to the flow substantially axially of the injector. Rear coupling 31 is screw threaded to an inner coupling 33 which in turn is screw threaded to a long, intermediate coupling or section 34 and the latter is screw threaded to a second inner coupling 33a, which, in turn, is screw threadedly connected to an inner sleeve portion of valve head 22. All of the above screw threaded parts together form a series of sleeve-like elements which form a continuation of the central passageway 32 for conducting the second chemical into passageway 32a of the valve head. A transverse opening 35 is formed in the valve head 22 to connect with opening 32a for conducting the fluid into the lowermost valve assembly 36 whose parts are identical to those of the valve assembly described in Figure 1. The annular outer passageway 29 communicates with an opening 37a drilled into valve head 22, which opening conducts chemical liquid through a second valve assembly 37, also of identical construction to the valve assembly shown in Figure 1. The valve head 22 has screw threaded to the end thereof a cap 38 having a pointed or wedge shaped end portion in which are formed openings 39 and 40 through which the two chemical liquids are discharged upon opening of the valves in the assemblies 36 and 37. The cap 38 is firmly held against valve head 22 by means of socket head cap screws 41 shown in Figure 4 and which are extended into recessed portions of the cap 38 similar to holes 39 and 40.

In operation, it will be apparent that the chemical liquid introduced into the inlet 28 and traveling through the annular outer passageway 29 along the length of the injector will be discharged through the opening 39 of the cap when the chemical attains sufficient pressure to overcome the closing action of the spring in the second valve assembly 37. Likewise the chemical introduced through the central passageway 32 will flow through the length of the injector, openings 32a and 35 and through valve assembly 36 only when this particular chemical has attained sufficient pressure to overcome the valve-closing action of the spring in assembly 36. Thus the chemicals have entirely separate paths in their flow through the injector and maintain separate paths even as they are discharged through openings 39 and 40 so that there will be no tendency for the chemicals to mix and thereby solidify and clog the injector passageways in the situation wherein the chemicals may be of a nature as to solidify after coming together.

Figure 3 shows sectionalized parts for building up an injector of any suitable length. It will be apparent that similar additional parts may be screw threadedly connected at the right portion as illustrated in the drawing to obtain such increase in length of the injector as desired to suit the length of any hole drilled in the ground. Or the injector may be shortened by unscrewing sectionalized parts. Moreover the wedge shape of the cap 38 facilitates penetration thereof through the ground and prevents injury of the valve assemblies. Moreover the valve assemblies are of such construction that the parts may be easily taken part and cleaned or replaced when necessary.

Thus it will be seen that we have provided an efficient and highly useful injector for injecting under pressure either a single chemical or two different chemicals or other fluids into a hole formed into the ground or elsewhere; furthermore we have provided an injector made of sectional parts to enable selective increase or decrease of the total length of the injector; furthermore we have provided an elastic expansion sleeve on the injector so arranged as to permit self-sealing of the injector to the walls of the hole through which it penetrates to prevent the escape of chemicals between the injector and the walls and to force the chemicals into the ground, instead, under pressure; furthermore we have provided an injector having two separate ports for conducting two separate chemicals so that the chemicals may be kept separated at all times as they are flowing through the injector and even as they are discharged from the injector through the nozzle or cap portion thereof so as to prevent the possibility of mixing of these chemicals which, in certain applications, become solidified upon mixing so as to clog the ports and openings of the injector; furthermore we have provided an injector assembly made up of simple parts which are inexpensive to manufacture and which may be easily and readily assembled or disassembled when necessary; furthermore while the injector is described as applicable for injecting chemicals for soil solidification it is also suitable for injecting other kinds of fluid under pressure into a porous medium.

It will be apparent that fluid may be discharged through either or both valves shown in Figure 3 by merely controlling the pressure in the two separate flow paths. Moreover the spring tensions of assemblies 36 and 37 need not be the same but may be different so as to allow different degrees of opening of the valves to simultaneously discharge different amounts of the two fluids under the same pressure. In some instances the different spring tensions may be used to effect different flow of the two fluids even at different pressures.

While we have illustrated and described several specific embodiments of our invention, it will be understood that these are by way of illustration only, and that various changes and modifications may be made within the contemplation of our invention and within the scope of the following claims.

We claim:

1. An injector for injecting a liquid into a cylindrical opening while sealing a wall portion of the injector against the inner wall of said opening, comprising a hollow, cylindrical, metallic sleeve having an externally threaded end portion; a hollow cylindrical valve body having an internally threaded end portion threaded onto said sleeve end portion, an expansion sleeve of elastic material surrounding and in telescoping relationship with said metallic sleeve and having one end in abutting relationship with an end of said valve body, a second metallic sleeve surrounding said first sleeve in telescoping relationship and having one end in abutting relationship with the other end of said expansion sleeve; a handwheel having a hub portion in screw-threaded relationship with the other end of said first-mentioned sleeve and in abutment with the opposite end of said second metallic sleeve so as to force said second metallic sleeve against the end of said expansion sleeve to increase the diameter of the central portion thereof and thereby provide sealing engagement with the inner wall portion of said opening, a fluid conduit extending axially of all of said sleeves throughout the entire length of said injector, and a spring-closed, pressure-openable valve screw-threadedly connected to the extreme end of said valve body.

2. An injector as recited in claim 1 together with an adapter screw-threadedly connected to the opposite end of said first-mentioned sleeve for introducing a fluid into said injector.

3. A fluid injector for injecting a fluid into a cylindrical opening while sealing a wall portion thereof against the inner wall of said opening, comprising a hollow cylindrical housing having a valve body secured to one end thereof; a fluid conduit extending axially throughout the entire length of said housing, a valve seat portion screw-threadedly connected to one end of said valve body, a valve stem in said body having a valve co-operable with said seat, a helical spring surrounding a portion of said stem for normally biasing said valve against said seat, said valve being responsive to a predetermined pressure within said injector to overcome the action of said spring and allow discharge of chemical through said valve and seat, said valve seat portion having a cylindrical groove surrounding said stem, said stem having an enlarged portion with polygonal walls whose edges are adapted to slide along the inner wall surface of said cylindrical groove to effect axial guiding movement of said stem, a second enlarged portion on said valve stem having polygonal outer walls whose edge portions are in sliding engagement with the inner wall portion of said valve body, said hollow cylindrical housing including an elastic expansion sleeve adapted to be expanded into sealing engagement with the inner walls of said cylindrical opening.

4. An injector for discharging two fluids along separate paths therethrough and for mixing the fluids at a discharge end thereof while sealing the injector against the inner wall of a cylindrical opening, comprising a hollow cylindrical housing having composite wall portions, including an intermediate expansion sleeve of elastic material; screw threaded means for expanding the diameter of said expansion sleeve to effect sealing engagement with a closely surrounding wall portion of a cylindrical opening into which said fluids are adapted to be injected; a valve body secured to one end of said housing and containing a pair of separate valves, each of which includes a spring for normally closing the valve, the action of which spring is overcome to cause opening of the valve upon attainment of a predetermined pressure of said fluid; a hollow cylindrical sleeve spaced from and surrounded by said housing and providing two separate flow paths, one within said sleeve and one between said sleeve and housing, and a pair of separate grooves formed in said valve body, each for connecting one of said paths to one of said valves.

5. An injector as recited in claim 4 wherein said housing comprises a plurality of metallic, hollow, cylindrical sleeves, screw-threadedly interconnected by a coupling member, and wherein said inner sleeve comprises a plurality of hollow cylindrical elements screw-threadedly connected together by a coupling member, and wherein an adapter is screw-threadedly connected to one end of said injector, whereby said injector may be selectively changed in length by adding or subtracting portions of said housing and of said inner cylindrical sleeves.

6. A chemical injector for conducting two chemical liquids therethrough along separate flow paths, and discharging and mixing them at one end of said injector into a cylindrical opening while preventing escape or backup of said chemicals between the injector and walls of said opening, comprising a hollow cylindrical housing having a hollow cylindrical elastic sleeve surrounding a portion thereof in telescoping relationship, a longitudinally slidable portion of said housing having one end in abutting relationship with one end of said elastic element, and a handwheel having a hub portion screw-threadedly connected to the outside of said housing portion and which upon tightening will push the ends of said elastic sleeve toward each other so as to expand the intermediate portion thereof in diameter to effect sealing engagement with the surrounding wall portion of said opening; an inner sleeve axially disposed in said housing in spaced relationship and extending throughout substantially the entire length thereof, providing two paths, one within, and one exteriorly of, said inner sleeve, and a pair of valves connected to the end of said housing, each being in communication with one of said paths.

7. An injector as recited in claim 6 together with a valve body screw-threadedly connected to one end of said injector for supporting said pair of valves, and a cap having a wedge-shaped end, said cap being screw-threadedly connected to said valve body and having a pair of openings in non-axial relationship with said housing and in communication with said respective valves.

8. An injector as recited in claim 4 in which the springs of said pair of valves are under different tension to allow different amounts of fluid flow simultaneously under a given pressure.

References Cited in the file of this patent

UNITED STATES PATENTS

| | | |
|---|---|---|
| 168,192 | Smith et al. | Sept. 28, 1875 |
| 1,547,194 | Arbon | July 28, 1925 |
| 1,578,046 | Logan | Mar. 23, 1926 |
| 2,122,749 | Morrisett | July 5, 1938 |
| 2,313,109 | Wertz | Mar. 9, 1943 |
| 2,357,769 | Rushmer | Sept. 5, 1944 |
| 2,363,018 | Poulter | Nov. 21, 1944 |
| 2,403,643 | Dresser | July 9, 1946 |
| 2,602,516 | Gray | July 8, 1952 |
| 2,634,748 | Morrison | Apr. 14, 1953 |
| 2,808,293 | Schenk | Oct. 1, 1957 |
| 2,860,489 | Townsend | Nov. 18, 1958 |

FOREIGN PATENTS

| | | |
|---|---|---|
| 639,074 | Great Britain | June 21, 1950 |